United States Patent [19]

Björkelund

[11] Patent Number: 4,555,633

[45] Date of Patent: Nov. 26, 1985

[54] PHOTOELECTRIC DIMENSION MEASURING SYSTEM

[75] Inventor: Mats Björkelund, Västerås, Sweden

[73] Assignee: Kockumation AB, Remadivisionen, Västerås, Sweden

[21] Appl. No.: 404,422

[22] Filed: Aug. 2, 1982

[30] Foreign Application Priority Data

Aug. 26, 1981 [SE] Sweden .............................. 8105051

[51] Int. Cl.$^4$ ........................................... G01N 21/86
[52] U.S. Cl. ..................................... 250/560; 356/385
[58] Field of Search ................... 250/221, 222.1, 560, 250/561, 578; 356/384, 385, 386, 387, 376

[56] References Cited

U.S. PATENT DOCUMENTS

| | | | |
|---|---|---|---|
| 3,727,069 | 4/1973 | Crittenden et al. | 250/222.1 |
| 3,781,115 | 12/1973 | Rader et al. | 250/560 |
| 3,980,890 | 9/1976 | Heckrodt et al. | 250/560 |
| 4,247,767 | 1/1981 | O'Brien et al. | 250/222.1 |
| 4,267,443 | 5/1981 | Carroll et al. | 250/560 |

*Primary Examiner*—David C. Nelms
*Attorney, Agent, or Firm*—Browdy and Neimark

[57] ABSTRACT

A method and a device for indicating the presence of an object in a measuring zone (E), and for objects having a measurable cross-sectional shape, also the extent of the object along a reference line (R). The method and device makes use of lines (A, B) of radiation emitters (11) and radiation receivers (12) located on opposite sides of the object, the receivers being fewer than the emitters. Created between the emitters and the receivers is a network of intersecting radiation paths in the measuring zone. An electronic unit (20) establishes which intersections (P$_1$) of the radiation paths are screened-off by the object. The invention is useful for indicating the presence of objects with arbitrary cross-section when it is desired to determine a lower limit for the size an indicated object shall have, and to determine a diameter measurement, in particular in the saw mill industry.

17 Claims, 15 Drawing Figures

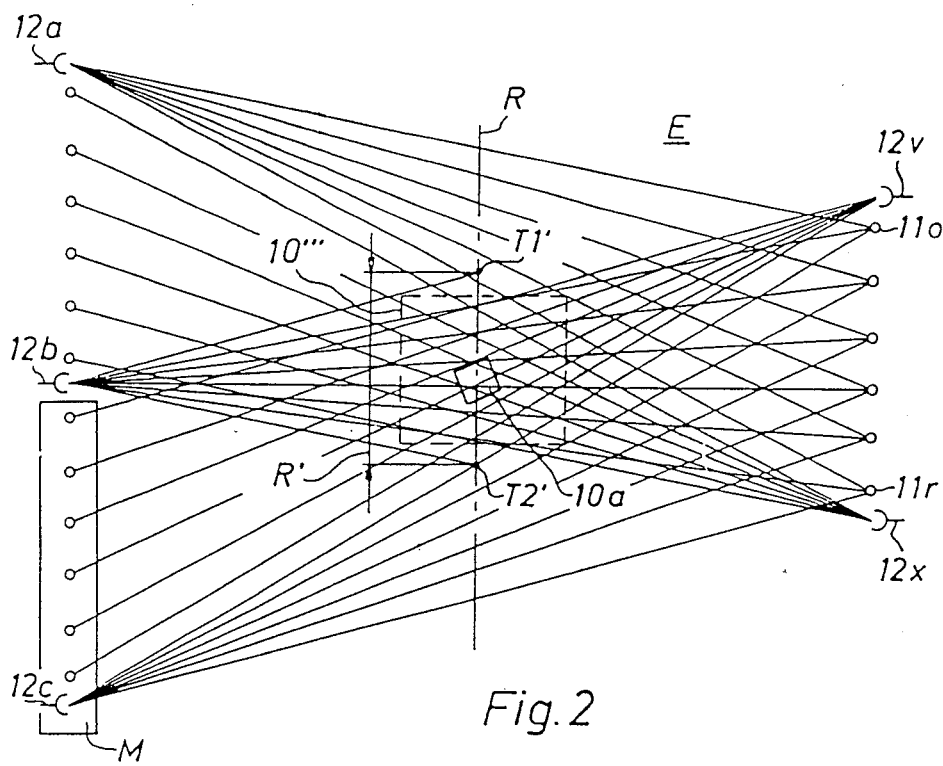
Fig. 2
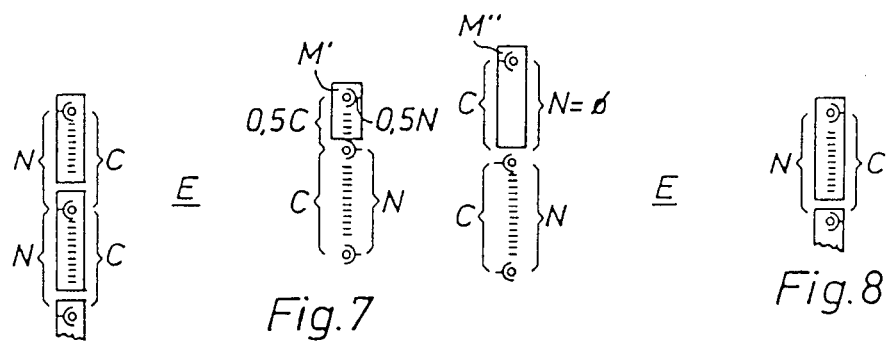
Fig. 7
Fig. 8
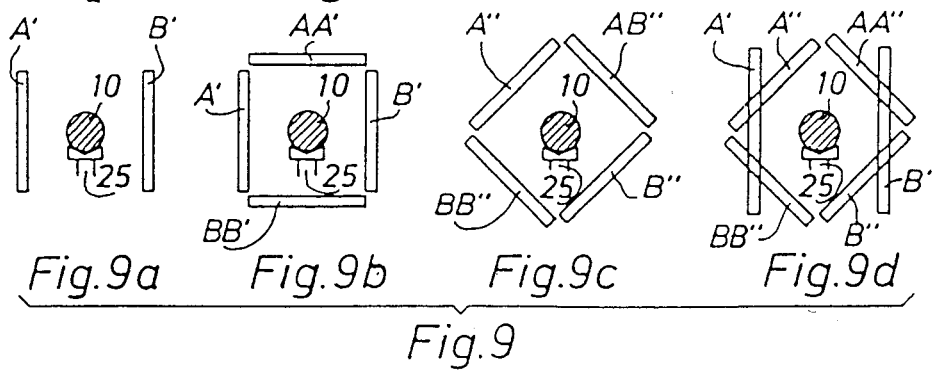
Fig. 9a  Fig. 9b  Fig. 9c  Fig. 9d
Fig. 9

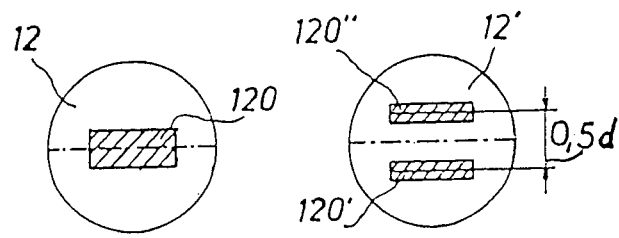
Fig.3a  Fig.3b
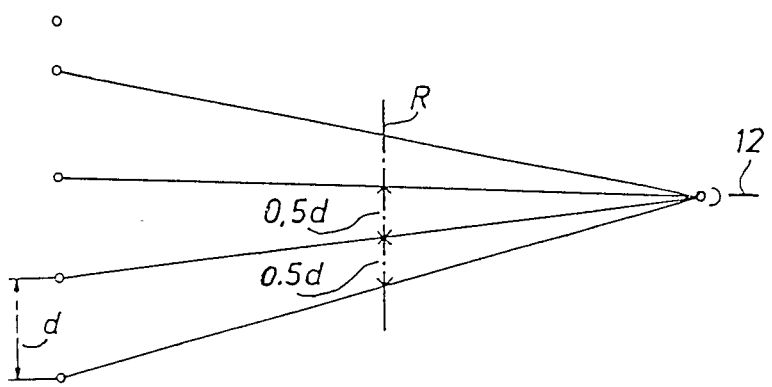
Fig.4a
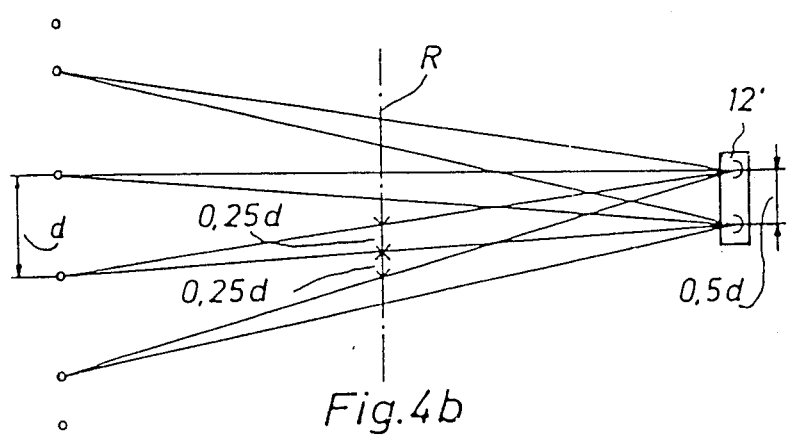
Fig.4b
Fig.4

PHOTOELECTRIC DIMENSION MEASURING SYSTEM

BACKGROUND OF THE INVENTION

The invention concerns a method of indicating the length of an object in a measuring zone having intersecting radiation paths by determining which of the intersections have been screened-off by the object along a reference line, and a device for performing the method. Depending on the cross-sectional shape of the object, the screened-off length corresponds, as will be explained more in detail below, either to the actual length of the measured object along the reference line, in which case the invention can be used for measurement of dimension, or the screened-off length will be greater than the extent of the measured object along the reference line, and with such objects (and certainly also with the first named objects), the invention may be used for indicating the presence of the object in a measuring zone comprising the reference line, with the advantage that indication of too small objects (such as accidental dirt or refuse particles) in the measuring zone can be avoided The objects, the dimension of which can be ascertained with sufficient accuracy according to the invention include objects with at least approximately circular cross-section having their center on the reference line. The term "approximately circular cross-section" refers to both geometrical shapes lying near a circle (such as ellipses with a minor difference between their axes or polygons with a greater number of sides), and irregular shapes similar to a circle, (such as cross-sections of logs). The invention is therefore particularly well suited for measuring dimensions in the saw mill industry, and it will be explained more in detail against this background.

In U.S. Pat. No. 3,806,253, issued on Apr. 23, 1974 to E. B. Denton a measuring device is described in which on one side of a measured object a line of emitters (light emitting diodes), and on the opposite side a line of receivers (photo-diodes), are provided at predetermined spacings. The emitters are activated one after the other and the receivers are interrogated. The cross-sectional diameter of the measured object is established with the aid of a number of receivers, which due to screening-off by the measured object, have not received light from any emitter. The best accuracy of the device, the "resolving power", is equal to one half of the spacement between the receivers, e.g. ¼".

In the same document there is further described a device where two emitters-receiver-parts generate two radiation paths which intersect one another, and where the object is moved in the plane of its cross-section so that it first breaks one, and then the other, radiation path elsewhere then in their common point of intersection. The measured diameter is calculated as a fraction of the time, i.e. depending on the transport velocity, during which both radiation paths have been screened-off. In Swedish patent specification No. 388,272 issued on Nov. 17, 1977 to Kockums Automation AB, a measuring device for objects with trapeziod shaped cross-section, such as boards, is described where an emitter-receiver-pair also is used for generating radiation paths which intersect one another, one element in said pair possibly being doubled, e.g. one receiver associated with two emitters.

All methods and devices previously known have however one or more of the following disadvantages:
the resolving power is limited by the actual spacing of the receivers, and a greater number of receivers (needed with smaller spacings) makes the construction expensive, because receivers are much more expensive then emitters;
moving parts such as rotating mirrors and the like are used which are liable to cause problems as they are dependent on temperature, and because of wear and sensitivity to vibrations also exhibit limited service life;
components with very high demands on precision (such as mirrors and lenses to focus light and/or to deflect it or make it paralles) are needed which are rather expensive;
components with a very reduced useful life in comparison with other parts of the system have to be used, such as lasers etc.;
the measured object must be transported transversally to its length dimension, which may cause problems as it is difficult to have a log lying still on a conveyor during such a transport, and moreover, in such a case, a plurality of measuring devices in several measuring planes has to be placed along the whole length of the object along the entire length thereof.

OBJECTS AND SUMMARY OF THE INVENTION

It is an object of the present invention to provide a method and a device of the aforesaid kind which has better resolving power than that which the spacing of the emitters would otherwise dictate, which demands fewer expensive receivers than inexpensive emitters, which has no moving and/or precision-worked optical or other components, and which enables measurement of diameter along the whole length of the measured object by the object being in known manner moved in the direction at its length past a single measuring device.

This object is attained by the provision of a method of indicating the presence of an object in a measuring zone using a plurality of stationary radiation emitters and receivers positioned on at least two opposite sides flanking the measuring zone so that the radiation paths between them intersect in the measuring zone, controlling the emitters and receivers with an electronic unit activating the receivers and the emitters in a scanning sweep manner by activating the emitters individually seriatim and the receivers in predetermined groups of one or more seratim sensing screening-off of separate radiation paths by the object with the electronic unit by creating a network of the radiation paths which meet in a network of predetermined location intersections, storing the locations of the intersections, and determining a dimension of the object along a line in the measuring zone based on the intersections screened off and not screened off by the object.

In an embodiment suited for measuring tapering objects such as logs or the like, the method of the present invention would further include storing the locations of the intersections in the electronic unit, determining a dimension of the object along a line in the measuring zone based on the intersections screened off and not screened off by the object, the object being known to decrease in size along said line in the measuring zone at sucessive locations along its length, moving the object through the measuring zone in the direction of its length, and controlling the emitters and receivers at each measurement along its length starting from the previous measurement, whereby the speed of each measurement is greater than what it would be if each measurement were made based on all of the predetermined location intersections.

BRIEF DESCRIPTION OF THE DRAWINGS

The invention will now be explained more in detail with the aid of exemplary embodiments according to the attached schematical drawings, in which

FIG. 2 shows more in detail ray paths in a part of the device according to FIG. 1;

FIGS. 3a and 3b show schematically first and second embodiments, respectively, of the receiver;

FIGS. 4a and 4b show the ray paths with first and second receiver embodiments, respectively;

FIGS. 7 and FIG. 8 show two ways in which the lines of FIGS. 5 and 6, respectively, may be terminated;

FIGS. 9a, 9b, 9c and 9d show four embodiments of measuring frames according to the present invention.

BRIEF DESCRIPTION OF THE INVENTION

Figure 1:
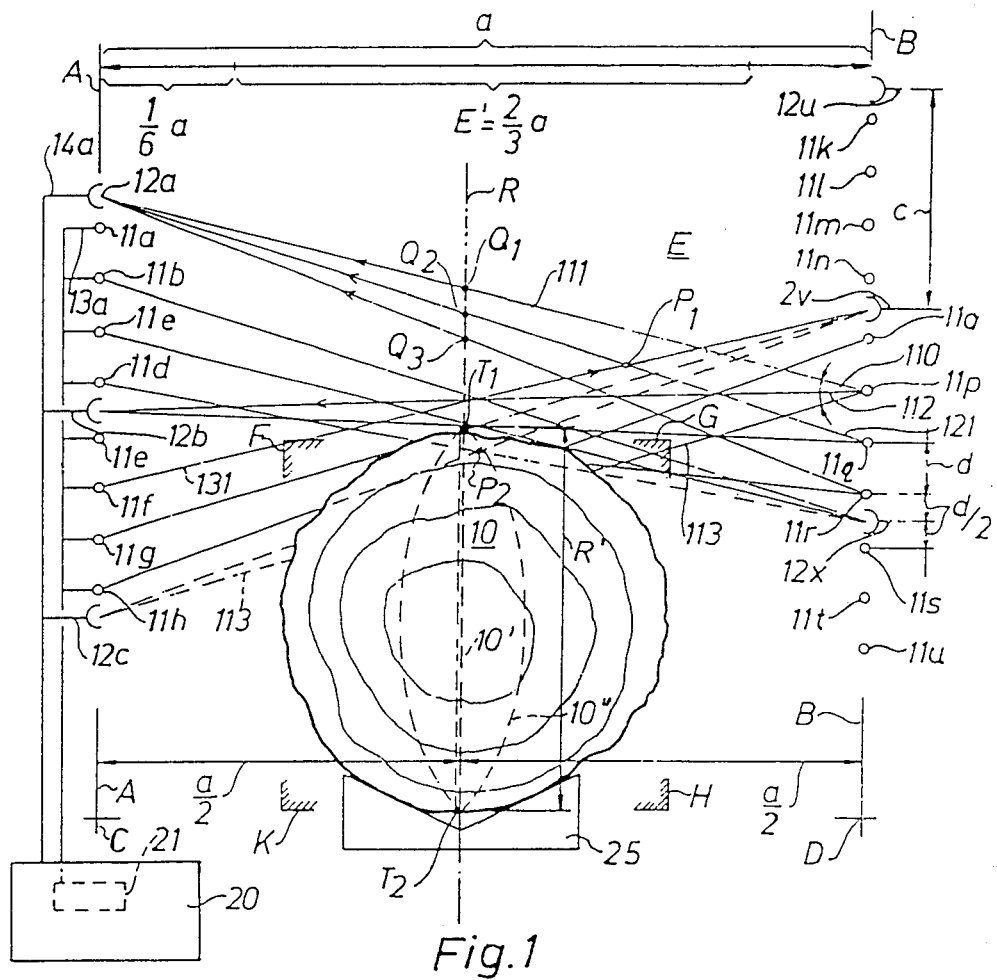
FIG. 1 is a front view of a first embodiment of a device according to the invention.

According to FIG. 1 a measured object 10, in the example a log, is carried on a carrier means 25, e.g. a conveyor. On each side of the carrier 25 a plurality of radiation emitters 11a, 11b, ... and a plurality of radiation receivers 12a, 12b, ... are arranged. The receivers are disposed with predetermined mutual spacings c, and between each two adjacent receivers a plurality of emitters is arranged at smaller mutual spacings d. There is therefore a greater number of emitters than of receivers present. The distance between a receiver and an adjacent emitter is 0.5 d.

In the example shown. the emitters and the receivers arranged in straight lines A, B with one of the lines on each side of the carrier means 25. The lines a, B are disposed at a mutual spacing a and a measuring zone E is located between them. The lines A, B extend in reality until the locations C, D, which for clarity is not shown in the drawing.

Through the middle of the measured object 10 extends a reference line R which in the example shown lies at equal distance 0.5a from both lines A, B. The reference line may however also be located closer to the one line than to the other, provided it is not quite adjacent one of the lines. It has shown in practice that the reference line R best be located in a region E' which has an extension of 0.67a and is equidistant (0.17a) from each of the lines A, B.

If all the emitters on one side of the measured object are connected by straight radiation paths, i.e. "rays", with all receivers on the opposite side, and vice versa, a network of rays will be obtained with a comparatively great number of points of intersection such as $P_1$ between two (or possibly more) rays. The locations of these intersections are fixed, because they are determined by the geometry of the measuring device, and they can therefore be fed-in as contants into an associated electronic device 20. Each intersection is unambiguously defined by the rays which intersect one another therein. Intersection $P_1$ e.g. is defined by the rays 121 and 131. Each radiation path or ray is in its turn defined by its two end points, i.e. a certain emitter and a certain receiver. Said two rays 121, 131 are thus defined by the emitter-receiver-pairs 11q–12a and 11f–12v.

Each emitter is adapted to emit, when activated, a divergent bundle of rays such as bundle 110 in the case of emitter 11p, comprising all rays included between two limiting rays 111–113. The emitters are further arranged to be each via an individual conductor such as 13 activated and deactivated (i.e. turned on and turned off), in sequence one after another, with the aid of some known device 21 for this purpose, which device conveniently is a component part of the electronic device 20.

Also the receivers are via conductors such as 14a connected to the electronic unit 20 for scanning or interrogation at the pace in which the emitters are activated. Preferably, the receivers are not interrogated one after the other, but one group after the other, each group comprising several, e.g. three receivers (in other words: for each emitter, three receivers are interrogated on the opposite side).

If in this way in the electronic unit 20 is e.g. registered that when emitter 11f is turned on, receiver 12v is activated, and when emitter 11p is turned on, receiver 12a is activated (which, with a view to the generally very high sequence frequency, practically occurs simultaneously), the conclusion is drawn that intersection $P_1$ lies free.

When a measured object such as log 10 is introduced into the measuring device, it occupies the place where a plurality of intersections such as $P_2$ lie. In consequence of screening-off, no ray, or at the least not all rays which normally meet there, can reach these screened-off intersections $P_2$.

Emission of each ray is always indicated by the device 21, and when a certain receiver simultaneously does not indicate activation, the conclusion is drawn that the respective rays (if several receivers do not react) could not unimpededly be produced. In the case of intersection $P_2$ the situation is therefore this; that when the device 21 indicates that emitter 11d has been turned on, no signal will be received from reveiver 12x, and when emitter 11h has been turned on, no signal will be received from receiver 12v, and consequently the conclusion will be drawn that the location of intersection $P_2$ is occupied by measured object.

From a study of FIG. 1 it will be understood that what actually has been measured is a section R', the screened-off length, on the reference line R between points $T_1$ and $T_2$ which represent two intersections lying closest one to the other on the reference line and not being screened-off.

FIG. 1 also shows in phantom lines a plate-shaped object 10' and an object 10" with lens-shaped cross-section. It is obvious that with these two objects the screened-off length R' exactly corresponds to their extend along the reference line R. It is at the same time evident from FIG. 1 that with an object with at least approximately circular cross-section, such as the case is with log 10, the screened-off length R' corresponds, to a degree of exactness which is sufficient for all practical purposes, to the diameter of this object which coincides with the reference line R. The cross-sectional shape of the objects 10, 10' and 10" can be inscribed in a circle having the diameter R' between points $T_1$ and $T_2$, or it may be said that the greatest extent of said shape coincides with the reference line R.

If, however, a measured object 10" has another cross-section, e.g. a square one, as is shown in phantom in FIG. 2, the screened-off length R' between the points $T_1$ and $T_2$ may be considerably longer than what the extent of the object along the reference line R is. With such objects no reliable indication of dimension is therefore obtained, but certainly an indication of presence. The electronic unit 20 can in this case be programmed to observe only screened-off lengths R' greater than a certain minimum value, i.e. to indicate only objects upward from a certain order of magnitude, and quite disregard smaller objects such as e.g. a splinter 10a etc.

In FIG. 2 is shown more in detail the part of the device according to FIG. 1 which lies between the receivers 12a, 12c and 12v, 12x. The number of emitters 11a, 11b, ... between each two receivers is greater than what for clarity has been shown in FIG. 1. In practice, e.g. 16 emitters may be located between two receivers having spacings of e.g. c=40 mm, that means that the value d is approximately 2.5 mm All emitters between two receivers, plus one of the receivers, may advantageously be joined into a single module, such as module M, and, upon application in the saw mill industry, on each side of the measured object e.g. 17 or 18 such modules may be disposed, each one with 16 receivers plus 1 emitter.

A triangle-shaped zone with corners at 12b, 11v, and 11r is evaluated or "supervised" by the emitter and receiver means shown in FIG. 2.

Infrared light is advantgeously used as emitted and received radiation, whereby among other things interference caused by surrounding illumination is eliminated. The emitters are then infrared light emitting diodes and the receivers are photo-diodes sensitive to infrared light.

According to an advangeous embodiment of the invention, multiple receivers are used instead of single ones, e.g. double or triple receivers, whereby the resolving power of the device is increased. A further increase of resolving power is obtained if as receivers one-dimensional position sensitive detectors are used which give a continuous information on the the migration of a light spot on the detector surface. Such detectors, available e.g. from the company Hamatsu Corporation under the denomination S 1352, include two signal electrodes, one at each end of the detector surface, and the electric current generated by the light spot is divided in relation to the spacing of the light spot from each electrode.

FIG. 3a schematically shows a single receiver 12 with a sole receiver element 120, and in FIG. 3b is shown a double receiver 12' with two receiver elements 120' 120" which are arranged with a spacing of 0.5d (i.e. the same spacing as between a receiver and a closely adjacent emitter, see emitter 12x in FIG. 1).

FIG. 4a shows how in a single receiver 12 a resolving power of 0.5d is obtained on the reference line R, while from FIG. 4b it is evident that with a double receiver 12', double resolving power, viz. 0.25d, will be obtained on the reference line. Thus, with the above named practical value d=2.5 mm and with linear rays, a resolving power better than 1.4 mm will be obtained with a single, and better than 0.7 mm with a double, receiver.

Figure 5:
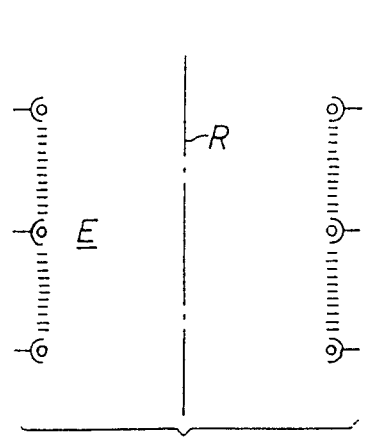
FIGS. 5 and FIG. 6 show two methods for arranging lines of opposing emitters and receivers.
Figure 6:
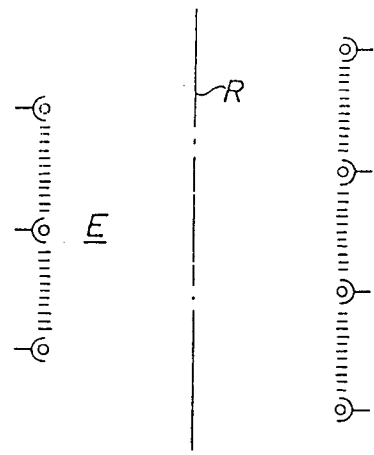

FIGS. 5 and 6 illustrate two alternative ways for locating opposite emitter and receiver modules. The method according to FIG. 6 provides better coverage of a given measuring region with the same number of receivers.

FIGS. 7 and 8 show two alternative modes of terminating the receiver and emitter lines A, B, i.e. of providing the terminal zones in these lines, i.e. the end modules. In the separate sections in FIGS. 7 and 8, each section represents one module M, their length c and the number N of emitters indicated. In the embodiment according to FIG. 7 the terminal module M' is a half-module, and in FIG. 8 the terminal module M" is an "empty module", i.e. only a pair of receivers are provided at the usual spacing c.

Emitter and receiver lines A, B are practice defined by straight, elongated carrier means, measuring ramps, in which the modules with the emitters and receivers and their supply conductors are arranged, and which are joined into measuring frames. With a view to the formerly stated values, considered appropriate upon application in the saw mill industry, a ramp normally comprising 17 or 18 modules, each with 16 emitters plus one receiver is approximately 65 to 70 cm long.

In FIG. 9 are shown four different embodiments of such measuring frames. In FIG. 9a is shown the simplest embodiment with two ramps A', B', intended for measurements in one direction and corresponding to FIG. 1. It will be understood that ramps A', B' also may be disposed in some other position than the vertical one, e.g. horizontally or inclined. In FIG. 9b there is shown a first embodiment for measurement in two directions. The ramps A' and B' have been complemented by two further ramps AA' and BB' to form a measuring frame with four operatiave sides. The embodiment according to FIG. 9c is also intended for measurement in two measuring directions and differs from the embodiment according to FIG. 9b only in that the measuring frame comprising the ramps A", B", AA" and BB" is turned through 45°. The embodiment according to FIG. 9d is intended for measurement in three directions of measurement and may be conceived as an amalgamation of the embodiments according to FIGS. 9a and 9c. The reason for constructing measuring devices with several directions of measurement is, that with one direction of measurement, the extent of the measured object only along one reference line R (which is parallel to the corresponding ramps) can be established, whereas the extent of the cross-section e.g. at right angles to the said line, and/or the contours of the cross-section, cannot be ascertained. Devices with several directions of measurement are apt e.g. to determine the obality and/or crooked shaped of a log etc.

With objects having varying cross-sections—such as logs which, as is well known, taper from the root end towards the top end—the measurement is repeated in several cross-sectional planes by the measured object being fed in its longitudinal direction in known manner through the measuring device, e.g. with a velocity of 1 m/sec. According to a preferred embodiment of the invention, a method with selective scanning amplitude may be applied in such a case in the following manner:

The log is transported in conventional manner and at the first measurement are established, besides a diameter value, also two absolute positions along the lines A and B corresponding to the two terminal points of the diameter. At the next measurement, and at the measurements following thereafter, only two smaller intervals are scanned, each comprising one of the two absolute values obtained latest. Instead of always scanning along the whole lines A and B, only two smaller intervals are scanned, the remaining regions, where no measuring result can be expected, being eliminated. The advantage with this method is that the so-called diagonal error, caused by the forward transport of the object during measurement, is reduced. While in saw mill practice normally 40 complete scanning strokes may be obtained per second up to 100 scanning sweeps per second may be obtained with the method applying the selective scanning amplitude.

The method and the device according to the invention have several advantages. No moving parts are needed, and it is well known that moving parts are easily damaged, develop operational faults caused by dirt particles etc, and that they very often have a shorter service life than stationary parts. A consideraly smaller amount of receivers in relation to emitters is needed, and the resolving power of the device depends on the spacing d of the emitters, not of the receivers, and is always better than this spacing ($0.5d$, $0.25d$). An emitter defined by an infrared light emitting diode is generally approximately ten times less expensive than a corresponding receiver defined by an infrared photo-diode. Emitters (LED) as well as receivers (photo-diodes) may be embodied by components available in commerce, e.g. the emitters by light emitting diodes TIL 48 from the company Texas Instruments, and the double receivers by double photo-diodes FIL-S2D from the company United Detector Technology Inc.

The device according to the invention can easily be modified in accordance with specific wishes in view of resolving power, extent of measurement etc. by "arming" the ramps in different ways.

When using the method with the selective scanning amplitude, one or several microdators of the type 8088 from the company "Intel", or similar apparatus, may preferably be used as "intelligent electronics". With the aid of information about the forward transport of the measured object, i.e. its movement past or through the measuring frame (such information can easily be obtained in known manner, e.g. with the aid of a pulse generator associated to the conveyor), even the length and the total volume of a measured object can be established in such electronics.

Figure 10:
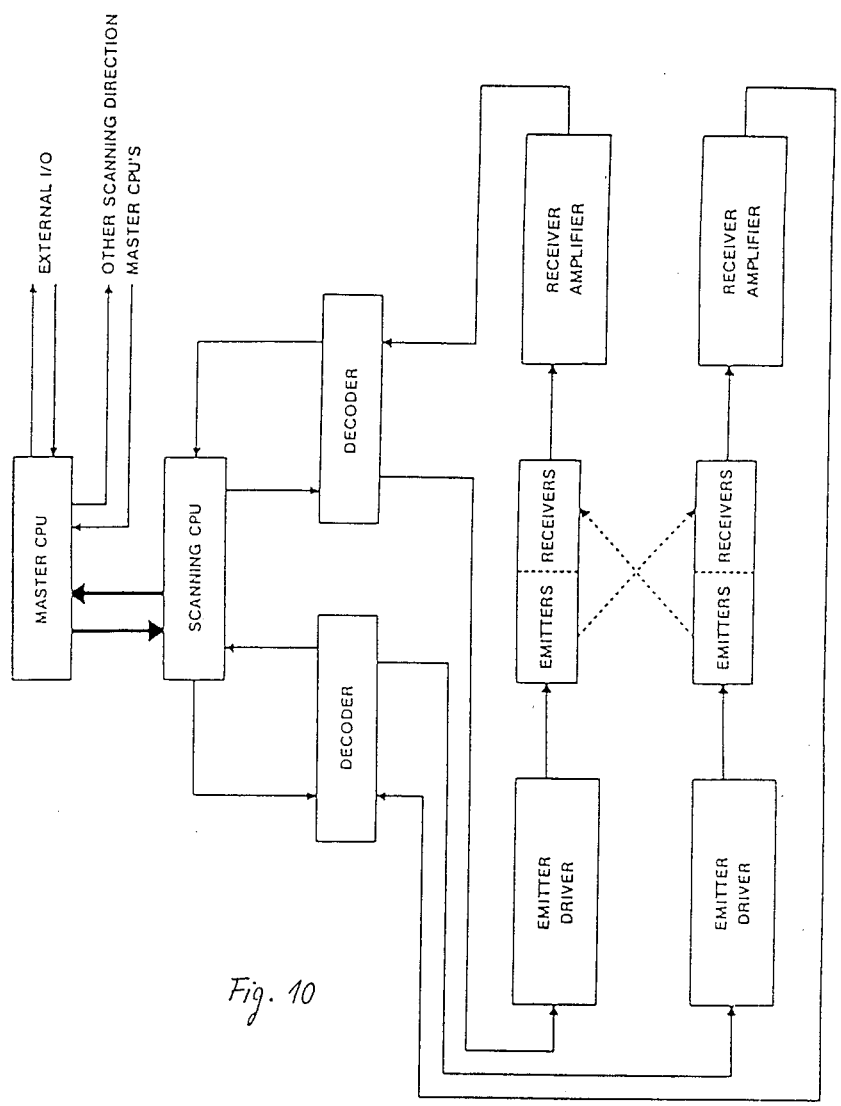
FIG. 10 is a logic diagram of the electronic function of device according to the invention.

In FIG. 10 there is shown a block diagram of the electronic function (electronic unit 20) of the device according to the invention. The various blocks perform the following functions: The block "Master CPU" answers for system management, external communication, application computations and system test handling. It should be noted that each measuring direction has its own "Master CPU", one of them acting however at the same time as system master for the whole device, if there are several measuring directions.

The block "Scanning CPU" answers for scanning control, primary evaluation and internal testing. The "Decoder" effects translation of digital addresses to individual emitters and enables selection of individual receivers. "Emitter Driver" powers the individually selected emitters, the double block "Emitters/Receivers" stands for the measuring ramps with e.g. IR LEDs and photo diodes. The block "Receiver Amplifier" amplifies receiver reactions to decodable indications.

I claim:

1. A method of indicating the presence of an object in a measuring zone E, and of measuring with a degree of accuracy depending on the cross-sectional shape of the object, the extent of the object along a reference line R located in the measuring zone comprising:
   positioning plural groups of stationary radiation emitters and receivers on opposing sides of said measuring zone so that radiation paths between them intersect in the measuring zone, each group including at least one emitter and at least one receiver;
   sucessively actuating and deactivating said emitters in a scanning sweep;
   successively interrogating one group of receivers after another at the same pace as the emitters are activated and deactivated, each group of receivers comprising at least one receiver;
   each activated emitter emitting radiation along diverging paths toward a plurality of receivers on the opposite side, and each activated receiver receiving radiation along converging paths from a plurality of emitters on the opposite side, whereby a network of radiation paths is created in the measuring zone having intersections with fixed predetermined locations;
   determining with electronic computer means which intersections are occupied by the object and the extent of the object along the reference line to establish with said degree of accuracy two uninterrupted intersections on the reference line between which a length of screened-off intersections lies; and
   repeating the scanning sweep and successive interrogation of receivers as desired in a plurality of cross-sectional planes relative to the object as the latter is transported at right angles to the planes past the emitters and receivers.

2. The method of claim 1, and further employing a plurality of reference lines subtending a selected angle, such as 90°.

3. The method of claim 1 wherein the extent of a scanning sweep is established on the basis of a previous scanning sweep on the same object, and is smaller than the maximum scanning sweep.

4. A device for indicating the presence of an object (10) in a measuring zone (E) and, with a degree of accuracy depending on the cross-sectional shape of the object, of the extent of the object along a reference line (R) located in the measuring zone, comprising:
   a carrier means for the object,
   a plurality of radiation emitters and receivers located so that radiation paths between them intersect in the measuring zone,
   and an electronic unit connected to said emitters and receivers and adapted to establish an indication result on the basis of radiation paths screened-off by the object,
   wherein on each of at least two opposite sides of said carrier means and at an invariable spacing therefrom, a plurality of receivers is provided at predetermined spacing, and between at least some pairs of neighbouring receivers at least two emitters are provided at smaller spacings,
   said emitters and receivers being located as to create in the measuring zone a network of inter-connecting radiation paths with a plurality of intersections ($P_1$, $P_2$),
   the emitters being adapted to emit, upon activation by the electronic unit, radiation along diverging paths towards a plurality of receivers on the opposite side and subsequently to be deactivated,
   the receivers being adapted to receive, upon activation by the electronic unit, radiation along converging paths from a plurality of emitters on the opposite side, and subsequently to be deactivated, and the electronic unit being programmable with the locations of said intersections and sequentially activating and deactivating the emitters one after the other, and at the same pace, the receivers in sequence one group after the other, each group comprising one or more receivers, said electronic unit being employed to determine on the basis of interrupted radiation paths which intersections are occupied by the object, and therefrom to conclude on the presence of an object of predetermined minimum magnitude in the measuring zone and, with said degree of accuracy, on the extent of the object along the reference line.

5. The device of claim 4, wherein the emitters and receivers on each side of the carrier means are arranged in lines (A, B) parallel with said reference line, equidistant therefrom and lying in the measured cross-sectional plane of the object.

6. The device of claim 4, wherein for the increase of the resolving power of the device, said receiver groups comprise two or more receivers (12').

7. The device according to claim 4, wherein the location of the emitters and receivers on one side of the carrier means are positioned relative to the emitters and receivers on the opposite side, e.g. by half the receiver spacing.

8. The device according to claim 4, wherein the number of emitters and receivers on one side of the carrier means is greater than on the opposite side 9. The device according to claim 4, wherein in order to prevent deterioration of measuring results in marginal zones of said lines, the number of emitters between a marginal pair of receivers on at least one side of said carrier means is smaller than the number between other pairs of receivers.

10. The device according to claim 4, and further comprising a module including one receiver and all the emitters between two receivers, said module defining a unit which can be used together with other equal units to form a measuring ramp (A', B').

11. A method of indicating the presence of an object in a measuring zone using a plurality of stationary radiation emitters and receivers positioned on at least two opposite sides flanking the measuring zone so that the radiation paths between them intersect in the measuring zone, comprising controlling the emitters and receivers with an electronic unit by activating said receivers and said emitters in a scanning sweep manner by activating said emitters individually seriatim and said receivers in predetermined groups of one or more seratim, sensing screening-off of separate radiation paths by the object with said electronic unit by creating a network of said radiation paths which meet in a network of predetermined location intersections, storing the locations of said intersections, and determining a dimension of the object along a line in the measuring zone based on said intersections screened off and not screened off by said object.

12. A method of indicating the presence of an object in a measuring zone using a plurality of stationary radiation emitters and receivers positioned on at least two opposite sides flanking the measuring zone so that the radiation paths between them intersect in the measuring zone, comprising controlling the emitters and receivers with an electronic unit, sensing screening-off of separate radiation paths by the object with said electronic unit by creating a network of said radiation paths which meet in a network of predetermined location intersections, storing the locations of said intersections in said electronic unit, determining a dimension of the object along a line in the measuring zone based on said intersections screened off and not screened off by said object, said object being known to decrease in size along said line in the measuring zone at successive locations along its length, moving the object through the measuring zone in the direction of its length, and controlling the emitters and receivers at each measurement along its length starting from the previous measurement, whereby the speed of each measurement is speeded compared to what it would be if each measurement were made based on all of said predetermined location intersections.

13. The method of claim 11, further comprising providing said receivers in smaller number than said emitters, whereby each receiver receives radiation from a plurality of said emitters.

14. The method of claim 11, further comprising spacing said emitters and said receivers respectively each along its respective side flanking said measuring zone at predetermined spacings.

15. The method of claim 12, further comprising activating said receivers and said emitters in a scanning sweep manner by activating said emitters individually seriatim and said receivers in predetermined groups seriatim.

16. The method of claim 13, and further comprising spacing said emitters and said receivers respectively each along its respective side so as to flank said measuring zone at predetermined spacings.

17. The method of claim 13, and further comprising activating said receivers and said emitters in a scanning sweep by activating said emitters individually seriatim and said receivers in predetermined groups seriatim.

* * * * *